(12) United States Patent
Karthikeyan et al.

(10) Patent No.: US 10,270,821 B2
(45) Date of Patent: Apr. 23, 2019

(54) CONTENT DELIVERY SYSTEM AND METHOD

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 251 days.

(21) Appl. No.: 14/780,704

(22) PCT Filed: Mar. 27, 2014

(86) PCT No.: PCT/GB2014/000119
§ 371 (c)(1),
(2) Date: Sep. 28, 2015

(87) PCT Pub. No.: WO2014/155041
PCT Pub. Date: Oct. 2, 2014

(65) Prior Publication Data
US 2016/0080446 A1    Mar. 17, 2016

(30) Foreign Application Priority Data
Mar. 28, 2013    (EP) .................................... 13250041

(51) Int. Cl.
*G06F 15/16*    (2006.01)
*H04L 29/06*    (2006.01)
(Continued)

(52) U.S. Cl.
CPC ........ *H04L 65/4076* (2013.01); *H04L 45/026* (2013.01); *H04L 45/16* (2013.01);
(Continued)

(58) Field of Classification Search
CPC ... H04L 65/4076; H04L 45/026; H04L 45/16; H04L 47/823; H04L 61/2061
(Continued)

(56) References Cited

U.S. PATENT DOCUMENTS

2006/0047845 A1 * 3/2006 Whited ............. H04L 29/06027
709/231
2007/0005771 A1    1/2007 Collet et al.
(Continued)

FOREIGN PATENT DOCUMENTS

WO    WO 2007/068290    6/2007

OTHER PUBLICATIONS

International Search Report for PCT/GB2014/000119 dated May 15, 2014, four pages.

*Primary Examiner* — Alan S Chou
(74) *Attorney, Agent, or Firm* — Nixon & Vanderhye PC

(57) ABSTRACT

A method of distributing content from a source in a content delivery network, the method comprising: monitoring requests for delivery of an item of content; obtaining a prediction of future demand in respect of the said content; applying a unicast-to-multicast switching decision algorithm, the switching decision algorithm taking into account the prediction of future demand and arranged to determine whether at least one trigger condition is met; and, dependent on the outcome of the unicast-to-multicast switching decision algorithm, initiating the transition of a plurality of unicast data streams to a multicast data stream in respect of the item of content.

15 Claims, 4 Drawing Sheets

(51) Int. Cl.

| | |
|---|---|
| *H04N 21/239* | (2011.01) |
| *H04N 21/24* | (2011.01) |
| *H04N 21/25* | (2011.01) |
| *H04N 21/472* | (2011.01) |
| *H04N 21/6405* | (2011.01) |
| *H04N 21/6408* | (2011.01) |
| *H04L 12/751* | (2013.01) |
| *H04L 12/761* | (2013.01) |
| *H04L 12/911* | (2013.01) |
| *H04L 29/12* | (2006.01) |
| *H04L 29/08* | (2006.01) |

(52) U.S. Cl.
CPC ........ *H04L 47/823* (2013.01); *H04L 61/2061* (2013.01); *H04L 61/2069* (2013.01); *H04L 65/4084* (2013.01); *H04L 67/18* (2013.01); *H04N 21/2393* (2013.01); *H04N 21/2408* (2013.01); *H04N 21/252* (2013.01); *H04N 21/47202* (2013.01); *H04N 21/6405* (2013.01); *H04N 21/6408* (2013.01)

(58) Field of Classification Search
USPC ........................................................ 709/219
See application file for complete search history.

(56) References Cited

U.S. PATENT DOCUMENTS

| | | | |
|---|---|---|---|
| 2009/0193485 A1* | 7/2009 | Rieger | H04N 21/2402 725/114 |
| 2011/0228770 A1* | 9/2011 | Dholakia | H04L 45/586 370/390 |
| 2018/0048918 A1* | 2/2018 | Salinger | H04N 7/17318 |

\* cited by examiner

CONTENT DELIVERY SYSTEM AND METHOD

This application is the U.S. national phase of International Application No. PCT/GB2014/000119 filed 27 Mar. 2014 which designated the U.S. and claims priority to EP Patent Application No. 13250041.4 filed 28 Mar. 2013, the entire contents of each of which are hereby incorporated by reference.

BACKGROUND AND SUMMARY

The present invention relates to the field of multicast routing.

Digital media, such as audio and/or video, can be streamed from a source to a host (end user) over a data communications network in either unicast or multicast transmission modes. Example applications include television and video services (including so-called "on demand" services) and videoconferencing. In unicast transmission, the media is streamed from the source to a single network destination identified by a unique address. In multicast transmission, the media is streamed from the source to a group of hosts simultaneously in a single transmission.

Multicast networks operate in two sections: one that manages membership of hosts to groups using protocols such as Internet Group Membership Protocol (IGMP), and the second that manages membership of routers to groups, which subscribe to content sources in the network. As those skilled in the art will appreciate, there are several multicast routing protocols that use different techniques to build a group membership tree. The present work is applicable, but by no means limited, to Protocol Independent Multicast—Sparse Mode (PIM-SM) routing, RFC 4601.

In unicast mode, when a host (end user) requires a piece of media content, it sends a request using a media streaming protocol with the Uniform Resource Identifier (URI) of the content or playlist that it would like to receive. Examples of typical protocols include stateless HTTP Streaming or stateful Real Time Streaming Protocol (RTSP). RTSP typically uses Real-time Transport Protocol (RTP) to deliver the content itself, whereas HTTP uses the HTML body to deliver the content in its response to the GET message. This is encapsulated using IP and routed to the media server. The content is then sent using unicast to the host. If a cache is in place, multiple requests for the same content within a short period of time triggers the caching process for the content, subsequent to which further requests for this piece of content are directed to the cache rather than the data source. Nevertheless, each source receives a unicast stream of the data from either the cache or the source. This results in data replication through the network, which it is desired to minimise, in order to make more efficient use of network capacity. Triggering multicast is one method to resolve this issue.

Conventionally, such triggering is initiated reactively, in response to upper and/or lower usage thresholds being crossed. If the upper threshold is exceeded then the transmission switches from unicast to multicast. When the usage falls below the lower threshold then transmission reverts to unicast.

According to a first aspect of the present invention there is provided a method of distributing content from a source in a content delivery network, the method comprising: monitoring requests for delivery of an item of content; obtaining a prediction of future demand in respect of the said content; applying a unicast-to-multicast switching decision algorithm, the switching decision algorithm taking into account the prediction of future demand and arranged to determine whether at least one trigger condition is met; and dependent on the outcome of the unicast-to-multicast switching decision algorithm, initiating the transition of a plurality of unicast data streams to a multicast data stream in respect of the item of content, wherein the prediction of future demand in respect of the said content is based on data unrelated to actual demand for said content. The data unrelated to actual demand for said content comprises data obtained from a social data source and/or data obtained from a search engine.

By using a prediction of future demand in this manner, multicast streaming can be proactively and autonomously initiated, thereby improving the allocation of network resources.

Optionally the method may further comprise maintaining a statistical record in respect of the requests directed at the source in respect of the item of content, and using at least some of the data in said record to obtain the prediction of future demand.

By way of example, the prediction of future demand may be based on the number of active sessions over a preceding time period. Alternatively, it may be based on an average number of active sessions over a preceding time period, the average number of active sessions being evaluated by determining the number of active sessions at times within the said time period and determining an average thereof.

The prediction of future demand may be specific to the time of the day (e.g. in relation to hourly news broadcasts), and/or to the day of the week.

Optionally the switching decision algorithm may take into account data in the statistical record.

Optionally the switching algorithm may take into account one or more parameters in the statistical record, the parameters selected from a group comprising: current number of active sessions; total number of requests for the said content during a given period of time; average session duration; probability that a session ends prematurely; data size of the said content.

The method may further comprise maintaining one or more background actions selected from a group comprising: periodically electing bootstrap routers irrespective of multicast being engaged in the network; candidate bootstrap routers advertising their candidacy to an elected bootstrap router; multicast routers sending "hello" messages to each other, irrespective of multicast being engaged in the network.

Optionally the process of transitioning the plurality of unicast data streams to the multicast data stream may comprise: generating a group address system; creating session description information for the content to be switched to multicast; and joining a host to the multicast data stream.

The transitioning process may further comprise generating a multicast-specific uniform resource indicator in respect of the said content.

Generating a group address system may comprise assigning a group address for every uniform resource identifier, or assigning a group address per geo-location combination of host group and source(s).

Furthermore, generating a group address system may comprise using an existing set of group addresses, or using a dynamic pool of addresses. Alternatively a group address may be received from an address assignment server.

The transitioning process may further comprise encapsulating packets from the source in a register message sent to a respective rendezvous point If the host has requested a unicast data stream and has not yet started to receive the stream, the transitioning process may further comprise embedding a new multicast uniform resource identifier in response code sent to a browser at the host, or sending the host a message containing the group address or a uniform resource identifier to obtain the group address.

If the host has already started to receive a unicast stream, the transitioning process may further comprise using a backchannel to issue the host with the group address or a uniform resource identifier to obtain the group address. If RTSP is being used in unicast, the process may further comprise announcing the change to the host using Announce, Redirect or Set_Parameter requests.

Further, the transitioning process may comprise causing the multicast content to start at a given time, in response to a request from the host to do so.

Alternatively, if HTTP is being used in unicast, the transitioning process may further comprise providing a new uniform resource identifier or group address to which the host can set up membership, in response to a request from the host for the current status of the streaming method.

The transitioning process may further comprise the upper-layer-protocol triggering an extended IP module that supports multicast, to issue a membership join request.

Optionally the transitioning process may further comprise terminating the unicast session in response to the host detecting that substantially the same content is being received via unicast and via multicast, thereby making more efficient use of network capacity.

The above method may be performed on or by a network device such as a router (in particular, the source's designated router) or a server.

Upon receiving a request in respect of an item of content, the method may further comprise a server establishing if any other server has any active sessions in respect of the said content and, if so, consolidating a plurality of session requests, made to different servers, such that a single server handles the plurality of session requests. This consolidated plurality of session requests may be sufficient to trigger multicasting, whereas, prior to consolidation, the number of session requests handled by the separate servers may not have done. Thus, this consolidation process can further improve the allocation of network resources.

Optionally the trigger condition may comprise a threshold value for the predicted future demand for the content.

According to a second aspect of the invention there is provided a network device (e.g. a router or a server) having logic configured to perform a method in accordance with the first aspect of the invention.

According to a third aspect of the invention there is provided a computer implementable instructions product comprising computer implementable instructions for causing a programmable computing device to implement the method of the first aspect of the invention, or to become configured as the network device of the second aspect of the invention.

A number of embodiments of the system are described herein. It will be clear to one skilled in the art that each of these embodiments may be implemented independently. However, embodiments are preferably implemented in conjunction with each other to provide multiple advantages as part of a larger system. Preferred features of one embodiment may be applied directly to other embodiments of the system. Further, method features may be applied directly to aspects of the apparatus.

In particular, in all of the embodiments described herein, the destination may be a host or a host designated router, H-DR, in a multicast network. The host may be the end user terminal associated with an end user or consumer of the content, or may be an intermediate device that serves the content to the user's device. For example, the destination may be a hub within a home network that receives the content for streaming to a user's terminal, such as an internet-connected television, a computer, a tablet or a telephone.

Similarly, in all of the aspects described above, the source may be the device that serves the content in the network or may be an intelligent routing component in the network that handles routing of consent to destinations. The content may pass through the intelligent routing component, or the component may control other components in the network, such as the source, to implement the methods described herein.

Further, in all of the embodiments described herein, the content is preferably video content and/or audio content, in particular on-demand content delivered in response to a request from a user. However, the skilled person will appreciate that the systems and methods described herein could equally be applied to networks for the distribution of data, such as text or image data, or software.

BRIEF DESCRIPTION OF THE DRAWINGS

Embodiments of the invention will now be described, by way of example only, and with reference to the drawings in which.

DETAILED DESCRIPTION OF PRESENT EXAMPLE EMBODIMENTS

The present embodiments represent the best ways known to the applicants of putting the invention into practice. However, they are not the only ways in which this can be achieved.

Definitions

The following terms, as used herein, have the following definitions:

Host: an end user device that requests some content from a source that can be delivered by unicast or multicast.

Source: provider of some content that either sends to hosts via unicast or pushes it into the network via multicast Content: electronic media, including but not limited to video files/streams, linear TV, audio files/streams (conference, radio, podcast), large file downloads etc.

Player: a software programme running on a host that can download content from a source and display it at the host. A player can be embedded into a web page via a browser plug-in (e.g. Adobe Flash Player).

Fixed stream: the delivery of a piece of content in a sequential manner via some download or streaming mechanism. The host will receive the content from a particular starting position onwards which coincides with the reception of the request by the source. The host cannot request content from before that starting position.

Flexible stream: the delivery of a piece of content in a sequential manner via some download or streaming mechanism. The host is free to request the content from an arbitrary starting position and can freely switch between positions in the content, resulting in the current content delivery to the host to stop and resume at the requested position.

DR: designated router.

Network Architecture

Figure 6:
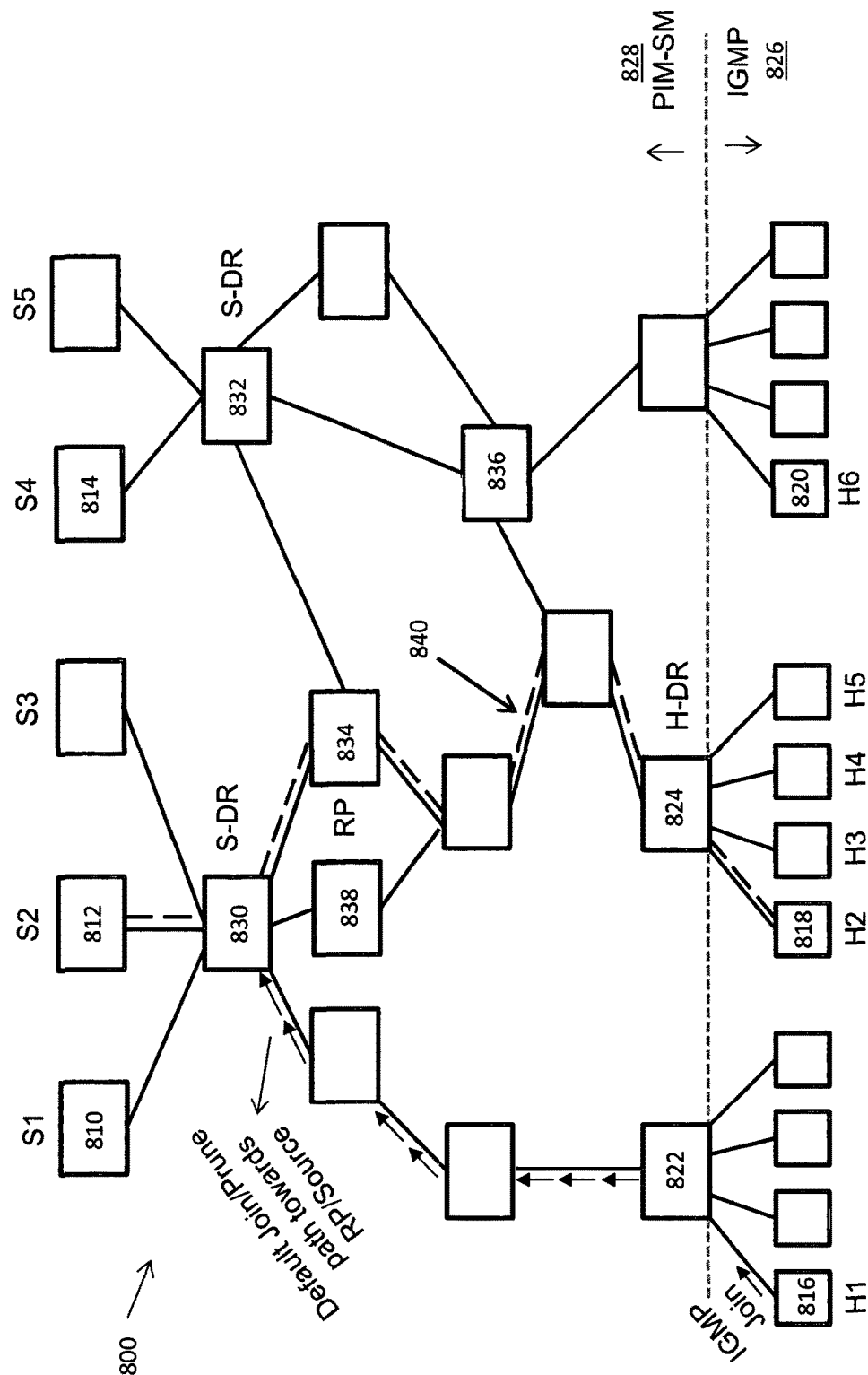
FIG. 6 is a schematic diagram of a network implementing multicast routing according to one embodiment.

A network 800 within which aspects of the present system may be implemented is illustrated schematically in FIG. 6. Multicast networks can be used to deliver content, such as video on demand content, from one of a plurality of content servers, or sources 810, 812, 814, to each of a plurality of destinations or hosts 816, 818, 820. Multicast networks can be notionally divided into two sections, one of which 826 comprises the hosts and the adjacent routers 822, 824, which communicate using protocols such as the Internet Group Management Protocol (IGMP) to establish and manage the multicast group memberships of the hosts. In an IPv6 network, this section of the network may operate using Multicast Listener Discovery (MLD) and ICMPv6 (Internet Control Message Protocol) messaging and references to IGMP and other IPv4 protocols herein are intended to include and encompass equivalent IPv6 protocols.

The other notional section of the multicast network 828 typically uses a protocol such as Protocol Independent Multicast, usually in Sparse Mode (PIM-SM) to route and implement multicast in the rest of the network, from the sources 810, 812, 814 to the routers adjacent the hosts 822, 824. In particular, PIM-SM or similar protocols of which the skilled person will be aware are used to manage the membership of routers to multicast groups, which subscribe to content sources in the network.

FIG. 6 illustrates a multicast network 800 that includes a plurality of sources, 810, 812, 814, each of which is capable of providing or serving content to a host 816, 818, 820 via the network. The sources are connected to source designated routers (S-DRs) 830, 832, which manage the delivery of content from the source to components in the network.

The network also includes a number of intermediate routers, IRs, 836, 838 that carry the multicast streams (along with other network traffic) from the sources 810, 812, 814 to the hosts 816, 818, 820. The IRs may include one or more Rendezvous Points (RPs) 834 for particular multicast streams. The RPs 834 are routers in the network through which multicast data for a particular group passes to all the downstream routers unless the downstream router is in a source-specific mode. That is, downstream routers or hosts 824, 818 join the multicast stream through the RP 834. Therefore, the downstream multicast tree is centred on the RP 834.

The routers closest to the hosts or destinations can be termed host designated routers (H-DR) 822, 824. A multicast stream destined for a particular host 816 passes through the associated H-DR 822 and the host sends to its H-DR requests to join or prune from a particular multicast group using IGMP.

By way of further example, a source 812 multicasting content in a multicast group G, broadcasts advertisement messages for that content throughout the network. Host H2 818 receives the advertisement and wishes to receive the multicast data.

The host 818 sends to its H-DR 824 an IGMP Join request specifying the multicast address of the multicast stream that it wishes to join, as detailed in the advertisement message, together with its membership information. The H-DR 824 builds a multicast tree back to the source 812 of the content, usually based on the shortest path through the network back to the S-DR 830 for the content. However, in most operational modes, the multicast tree must pass through the designated RP 834 for that multicast stream, and not through other IRs 838, even if these would provide a shorter path back to the S-DR 830. The H-DR 824 sends periodic Join/Prune messages towards the group-specific RP 834 for each group for which it has active downstream members.

If the multicast tree is already delivering content to other hosts, the H-DR 824 simply builds a branch back to the existing multicast tree. If the host is the first to request the content in that area of the network, the tree may be built back to the S-DR 830. The multicast tree is indicated in FIG. 6 by a dashed line 840. Once the multicast tree has been built, multicast content can be delivered down the tree to the H-DR 824 and from there to the requesting host 818.

In PIM-SM based multicast systems, when a host Designated Router (host-DR) receives a Membership Report from one of its hosts to join a group G, it uses its unicast protocol to look up the address of the neighbour who is the next hop on the shortest path towards the RP (Rendezvous Point Tree, RPT) or the source (Shortest Path Tree, SPT). The same action is performed when an intermediate router receives a Join/Prune message from downstream routers with the same request. They use the unicast protocol's routing metric as the MRIB routing metric, associated with a metric preference that reflects the method through which this cost was learned (i.e. each unicast protocol has an associated metric preference value and metric costs can only be compared if the metric preference value is the same). The next hop neighbour with the lowest cost is chosen as the upstream neighbour, to which a Join/Prune message is sent. A Join/Prune message, as it travels all the way to the RP or source, triggers the creation of a Group-related route entry in each router. This reverse route that is built to the RP or the source is used to route the flow of multicast data packets in the downstream direction from the RP or source to the end host.

Each router on the multicast tree 840 maintains a route entry within an internal database, such as the Multicast Routing Information Base (MRIB), that includes information such as the source address, the group address, the incoming interface at which packets are received and a list of outgoing interfaces to which packets should be sent for onward transmission down the multicast tree. Timers, flag bits and other information may also be stored in the MRIB entry.

To leave a multicast group, G, the host 818 sends a Prune request to the H-DR 824, which then propagates upwards through the multicast tree to tear down that branch of the tree up to the point at which the tree is needed to deliver the multicast data to other hosts.

Overview of 'Multicast Enabler'

We propose a novel entity called a 'multicast enabler' that enables a network operating in unicast mode to autonomously switch over to multicast mode based on predictive data analytics. This is especially useful when several users request a popular piece of content in live streaming mode (e.g. live streaming of a news item or a sports match which does not allow trick mode operations) or as a progressive download. We use PIM-SM in our examples but the principles can be translated to other multicast routing protocols as well. We exploit data collected by the source's Designated Router (henceforth source-DR, first hop from the source towards the host or the Rendezvous Point (RP)). We monitor the hit-rate of requests at the source-DR for a given URI, as well as social data sources to trigger a transition of a number of unicast data streams for a source into a single multicast stream through a multicast tree, both in reactive and predictive form. We assume that all network elements run unicast routing protocols, hosts support IGMP and routers in the network support PIM-SM.

The functionality of the multicast enabler can be distributed across source-DR and the host-DR PIM routers or run centrally, evaluating the trigger conditions and issuing actions into the network when they are met. We assume a distributed system where intelligence is placed in host and source nodes which communicate with each other.

Figure 1:
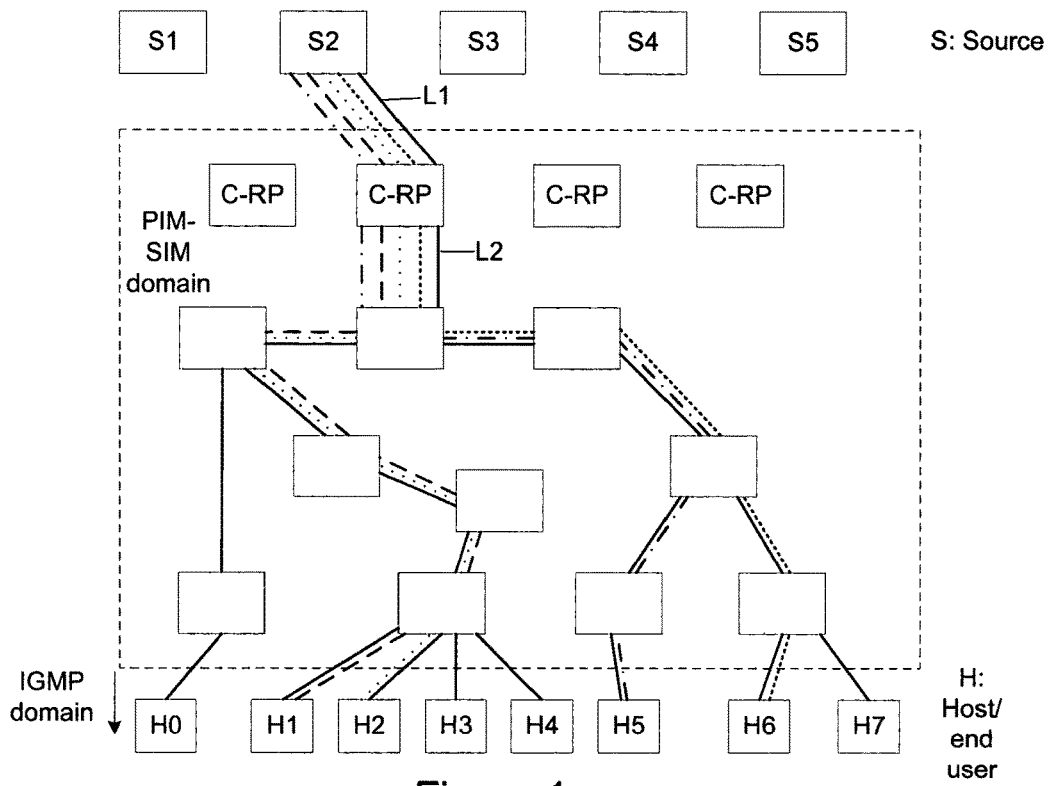
FIG. 1 is a schematic diagram of a network having a plurality of unicast streams.
Figure 2:
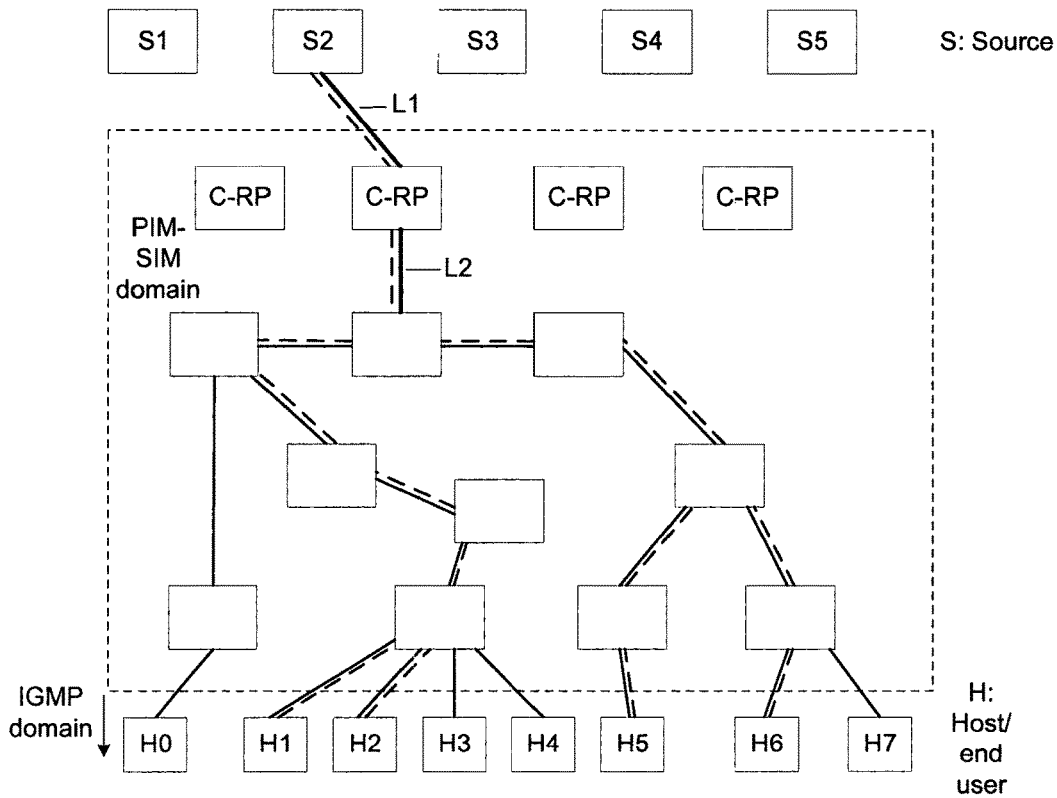
FIG. 2 is a schematic diagram of the network of FIG. 1 in which the plurality of unicast streams have been transitioned to autonomous multicasting.

FIGS. 1 and 2 illustrate the transition enabled by the multicast enabler, with FIG. 1 schematically illustrating a network having a plurality of unicast streams, and FIG. 2 schematically illustrating the same network in which the unicast streams have been autonomously switched to multicasting.

By way of example, in FIG. 1, network links L1 and L2 carry four copies of the same data (indicated by different styles of broken lines) to hosts H1, H2, H5 and H6. After the operation of our multicast enabler, the data flow will look as shown in FIG. 2. There is only one copy of the data flowing as multicast, with hosts H1, H2, H5 and H6 having subscribed using IGMP to the associated group for this stream. It is evident that preventing data replication in the network when possible makes better use of network capacity. Simplifying several unicast streams to a single stream from the source through the multicast tree (in both Shortest Path Tree (SPT) or RP Tree (RPT) form) provides better Quality of Service to the hosts instead of them having to compete with each other for consuming identical data through link sharing.

Decision Mechanism

This section describes the trigger conditions, evaluated by the multicast enabler, for switching from unicast to multicast.

When a host requests content from a source it connects to a URI, for example, http://www.youtube.com/watch?v=AvbSMBKBZgY, to request a video file from the source youtube.com. The URI request is typically triggered by the user selecting a link in a web page displayed in a web browser or by entering it into a player that can play the requested content. Typical players are Microsoft's Windows Media Player, the open source player VLC, Apple's Quicktime, or a Flash player that is embedded into a web page via JavaScript and which uses the Adobe Flash browser plugin on the host to play content. Many players can either be used as standalone software on the host or as browser plugin displaying the content in a web page within a web browser like Internet Explorer or Mozilla Firefox. The YouTube URI shown above will result in a Flash video file being played within the browser window. Note that while we use a browser scenario as an example, the present work equally applies to TV set-top box scenarios, for example. The variation between the two lies primarily in the protocol stack that is used for data transfer, and in the present work we only specify the required functionalities from the underlying protocols.

The download from a source to a host is typically done via unicast as a progressive HTTP download. The media content is returned in the body of an HTML file. The encoding of the media is provided as MIME type which allows the browser or player to identify the correct handler for the content. This method of delivering content does not allow the host pausing or aborting the playback on the server because HTTP is stateless. By using metadata attached to content files, progressive download can allow users full seek and navigation at any time without requiring full file download. By using bandwidth throttling (specifying the bit rate at which files should be delivered), it is possible to deliver only the amount of content that will be viewed, preventing wasted bandwidth.

An alternative is to provide, content video via streaming protocols such as Real Time Streaming Protocol (RTSP), Real-time Transport Protocol (RTP), or Real-time Control Protocol (RTCP) that require proprietary players and servers. If a streaming protocol like RTSP is used, then the URI initially requested by the player may point to a playlist file which contains multiple URIs pointing to content files. The player then decides which file to play in which order or allow the user to select from and switch between these playlist items. The request to play some content will also be transmitted to the source via the Hypertext Transfer Protocol (HTTP), but instead of a single URI the request will be embedded in a special protocol running over HTTP.

The following provides an example for requesting content via RTSP. C denotes the client (host) and S the server (source). The client sends a DESCRIBE request, followed by SETUP and PLAY requests. A DESCRIBE request includes an RTSP URL (rtsp:// . . . ), and the type of reply data that can be handled. The default port for the RTSP protocol is 554 for both UDP (deprecated and very rarely, used) and TCP transports. This reply includes the presentation description, typically in Session Description Protocol (SDP) format. Among other things, the presentation description lists the media streams controlled with the aggregate URL. In the typical case, there is one media stream each for audio and video.

```
C->S:  DESCRIBE rtsp://example.com/media.mp4 RTSP/1.0
       CSeq: 2
S->C:  RTSP/1.0 200 OK
       CSeq: 2
       Content-Base: rtsp://example.com/media.mp4
       Content-Type: application/sdp
       Content-Length: 460
       m=video 0 RTP/AVP 96
       a=control:streamid=0
       a=range:npt=0-7.741000
       a=length:npt=7.741000
       a=rtpmap:96 MP4V-ES/5544
       a=mimetype:string;"video/MP4V-ES"
       a=AvgBitRate:integer;304018
       a=StreamName:string;"hinted video track"
       m=audio 0 RTP/AVP 97
       a=control:streamid=1
       a=range:npt=0-7.712000
       a=length:npt=7.712000
       a=rtpmap:97 mpeg4-generic/32000/2
       a=mimetype:string;"audio/mpeg4-generic"
       a=AvgBitRate:integer;65790
       a=StreamName:string;"hinted audio track"
```

A SETUP request specifies how a single media stream must be transported. This must be done before a PLAY request is sent. The request contains the media stream URL and a transport specifier. This specifier typically includes a local port for receiving RTP data (audio or video), and another for RTCP data (meta information). The server reply usually confirms the chosen parameters, and fills in the missing parts, such as the server's chosen ports. Each media stream must be configured using SETUP before an aggregate play request may be sent.

```
C->S:  SETUP rtsp://example.com/media.mp4/streamid=0 RTSP/1.0
       CSeq: 3
       Transport: RTP/AVP;unicast;client_port=8000-8001
S->C:  RTSP/1.0 200 OK
       CSeq: 3
       Transport: RTP/AVP;unicast;client_port=8000-
8001;server_port=9000-9001
       Session: 12345678
```

A PLAY request will cause one or all media streams to be played. Play requests can be stacked by sending multiple PLAY requests. The URL may be the aggregate URL (to play all media streams), or a single media stream URL (to play only that stream). A range can be specified. If no range is specified, the stream is played from the beginning and plays to the end, or, if the stream is paused, it is resumed at the point it was paused.

```
C->S:  PLAY rtsp://example.com/media.mp4 RTSP/1.0
       CSeq: 4
       Range: npt=5-20
       Session: 12345678
S->C:  RTSP/1.0 200 OK
       CSeq: 4
       Session: 12345678
       RTP-Info:
url=rtsp://example.com/media.mp4/streamid=0;seq=9810092;
rtptime=3450012
```

There are other commands for RTSP that allow the client to pause or abort playing the content.

In this work we will consider the scenario that a large number of hosts request identical content from a source. We assume that all hosts play the content from the same position, i.e. the content is delivered in some form of fixed stream and a host can join that stream at any time while the source is still playing out the fixed stream, i.e. before it has finished. We further assume that the source delivers the content as individual fixed streams to each host via unicast.

To provide many identical copies of the same content via unicast wastes network bandwidth. It is therefore in the interest of the network operator to detect this situation and replace many unicast copies of the content by one multicast copy.

Consider a gateway router that is attached to the source and provides internet access to the source. If this router is multicast enabled it would become the source-DR of the source in a multicast scenario. We now specify how the source-DR can detect that many unicast fixed streams are being played out as a precursor to switching over to multicasting.

Figure 3:
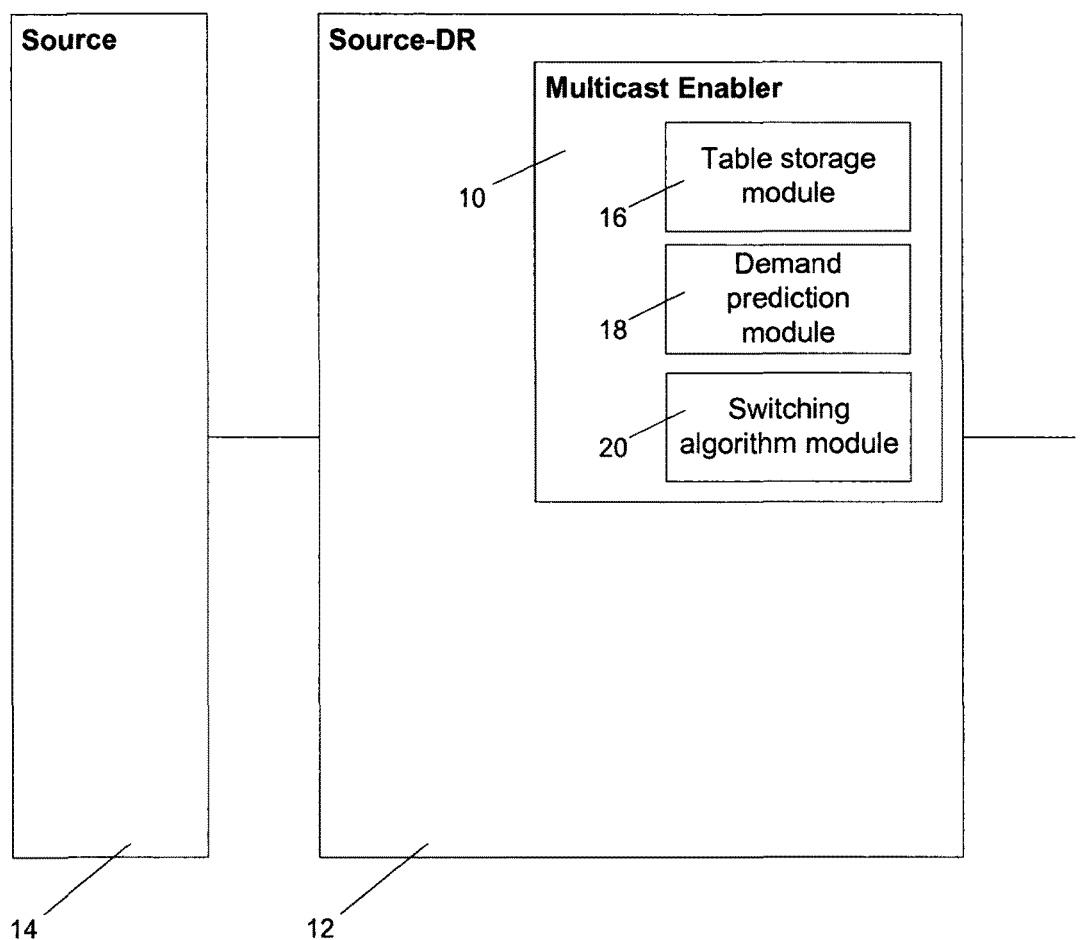
FIG. 3 illustrates a 'multicast enabler' operating on a source's designated router.
Figure 4:
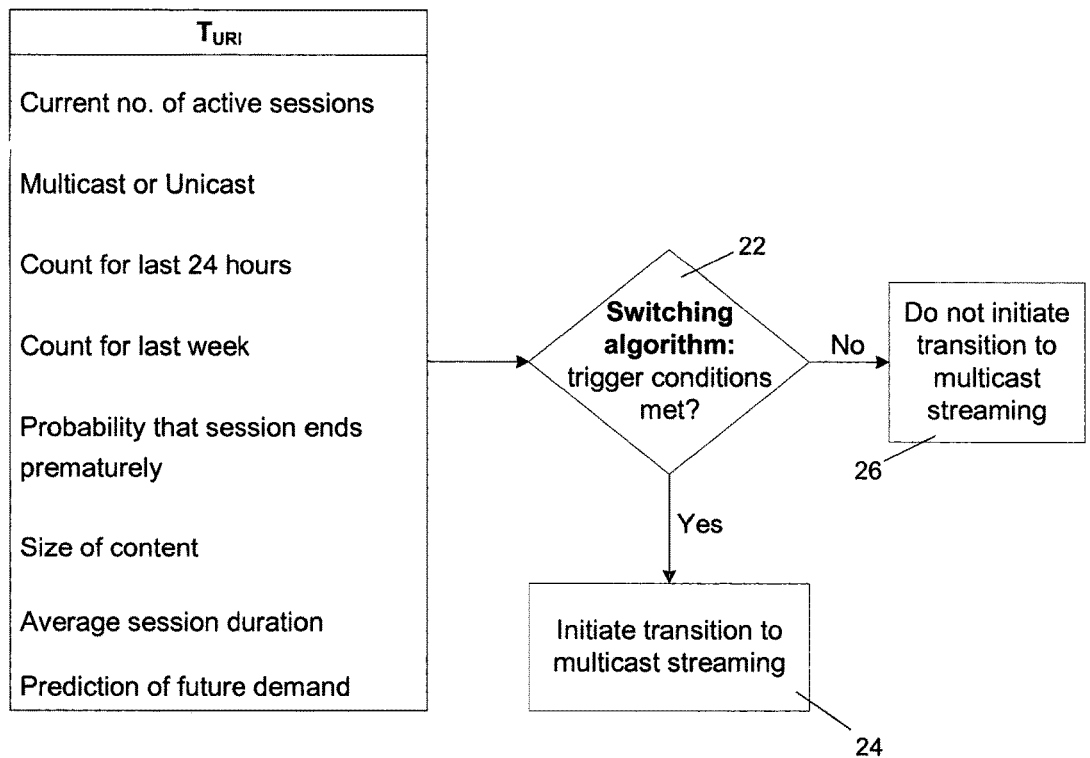
FIG. 4 illustrates the operation of a switching algorithm associated with the multicast enabler.
Figure 5:
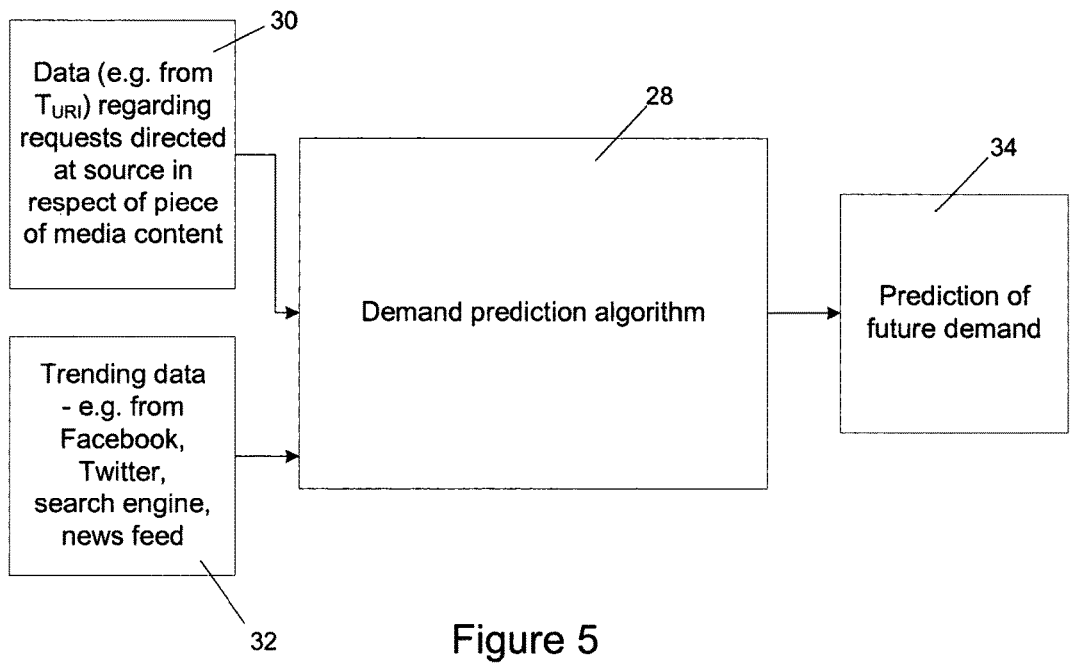
FIG. 5 illustrates the operation of a prediction algorithm associated with the multicast enabler.

In essence, and with reference to FIGS. 3, 4 and 5, the multicast enabler 10 (e.g. running on a source-DR 12, or elsewhere) monitors requests directed at a source 14 in respect of a piece of media content, and obtains a prediction of future demand 34 in respect of that specific content. Taking into account the prediction of future demand 34, the multicast enabler 10 determines the outcome of a unicast-to-multicast switching algorithm 22. If the outcome of the switching algorithm 22 is that trigger conditions are met, it initiates (24) the transition of a plurality of unicast data streams to a multicast data stream in respect of the content in question. If the outcome of the switching algorithm is that trigger conditions are not met, it retains the plurality of unicast data streams and does not initiate a transition to multicast (26).

In more detail, the multicast enabler 10 of the source-DR 12 monitors all requests directed at the source 14 and maintains a table $T_{URI}$ of URIs and associated counters and other values (see Table 1 below). The table $T_{URI}$ may be stored within a table storage module 16 of the multicast enabler 10, or elsewhere (e.g. on a separate device connected via the network). The source-DR 12 preferably also takes into account if identical content can be delivered from different sources in a load-balancing scenario. As long as these sources are connected to the same source-DR this can be done, for example, by stripping the first part of the URI (e.g. www.example.com, www1.example.com, www2.example.com are all mapped to example.com).

The entries in this table are created or updated each time an URI is being detected via an incoming request from some host on the Internet. The source-DR checks if the URI is already stored in the table and if not, it creates a new entry and sets the counter to 1. If the entry exists, the counter is incremented. The source-DR also maintains a list of sessions that are associated with the download of a URI. Each time a session is terminated the counter of the corresponding URI is decreased.

If the URI represents content that is available over a longer period of time, the source-DR can also collect additional details for each URI. This would be the case if the content represents a regularly repeated piece of content that is played out hourly, for example. This could be an hourly news programme where the content changes for each play-out or a movie that is offered again every 15 minutes, etc. These extra details can be duration or size of content, past frequencies of content being requested, probability of content being requested at particular times, probability that a session is terminated prematurely because the host stops receiving the content, average duration of the content playing out before the number of sessions fall beyond a threshold, etc. All these details can be used by the source-DR to decide if or when to initiate multicast, as illustrated schematically in the flow diagram of FIG. 4, and as described in more detail below in relation to the switching algorithm 22.

The table $T_{URI}$ can also contain predictive information in respect of the future demand for the content in question. As illustrated schematically in FIG. 5, a predictive algorithm 28 running on the source-DR (e.g. in a demand prediction module 18 of the multicast enabler 10) or elsewhere, can monitor the content consumption and the types of content being requested. Based on the details in $T_{URI}$ (e.g. data 30) or by using additional information the algorithm can predict how popular a piece of content related to a URI will be and this can be used to immediately start multicast when the first request comes in or to otherwise change the decision strategy of when to switch to multicast. Additional information 32 can come from social networks by filtering, for example, Facebook or Twitter traffic for content recommendations, or news content can be filtered for events (e.g. a large earthquake in San Francisco) that could point to the fact that news programmes have a high chance of being requested, etc. Trending data can also be obtained from search engines. In general, these techniques are known from content recommender engines. Information from such engines can be used to modify the prediction of future content requests which otherwise is based on historic data only. The algorithm 28 uses this kind of information to generate a likelihood value 34 for a piece of content being highly popular and such likelihood values can in turn be used by the source-DR to modify its policy for switching a content delivery to multicast.

TABLE 1

Example of the table $T_{URI}$

| ID | URI | N | MC/UC | C24 | CW | P | S | AD | $PS_{0,\ldots,23}$ |
|---|---|---|---|---|---|---|---|---|---|
| 1 | Example.com/movie.mp4 | 324 | MC | 15,788 | 75,668 | 0.2 | 459 | 54 | (00.00:120, 01.00:105, 02.00:85 08.00:24, . . . , 12.00:233, . . . , 18.00:755, 22.00:400, 23.00:230) |
| 2 | Example.com/newsshow.mp4 | 133 | MC | 3,567 | 23,522 | 0.4 | 136 | 11 | (00.00:12, 01.00:8, 02.00:0, . . . , 08.00:122, 12.00:155, . . . , 18.00:255, 22.00:157, 23.00:29) |
| 3 | Example.com/blockbuster.mp4 | 4578 | MC | 145,778 | 1,556,347 | 0.02 | 678 | 103 | (00.00:3560, 01.00:1540, 02.00:1099 08.00:49, . . . , 12.00:566, . . . , 18.00:12755, 22.00:20340, 23.00:8466) |
| 4 | Example.com/boring_movie.mp4 | 3 | UC | 73 | 277 | 0.8 | 369 | 45 | (00.00:21, 01.00:19, 02.00:13 08.00:0, . . . , 12.00:1, . . . , 18.00:6, 22.00:7, 23.00:17) |
| 5 | Example.com/brand_new_movie.mp4 | 17 | UC | 120 | 120 | 0.01 | 567 | 97 | (00.00:77, 01.00:56, 02.00:3 08.00:0, . . . , 12.00:0 . . . , 18.00:233, 22.00:221, 23.00:198) |

Key to Table 1 (and also Tables 2 and 3 below):
N = Current number of active sessions
MC/UC = Multicast (MC) or Unicast (UC)
C24 = Count for last 24 hours
CW = Count for last week
P = Probability that session ends prematurely
S = Size (in MB)
AD = Average session duration (minutes)
$PS_{0,\ldots,23}$ = Predicted demand for content per time of day
(Vector of entries: hour.minute:predicted-number-of-sessions)

Table 1 contains one example for predictive information in $T_{URI}$. The last column of Table 1 contains predictive session numbers for each hour in the next 24 hours. These numbers can be computed by several types of predictive algorithms. A very simple approach would be to count the active sessions at each full hour over the last, for example, 3 days and use the average number of active sessions as the prediction for the next 24 hour period. These numbers will be updated every hour. It is also possible to use longer term average for types of content. For example, by measuring the take-up of a new movie it is possible to produce a typical viewing profile for the first few days that can be used to estimate the number of requested session for each hour of the day (see last column of Table 1). Other more complex predictive algorithms which are known to those skilled in the art can be used.

EXAMPLE

Compute hourly demand for a content URI with $N_t$ being the demand count at time t.

$$PS_t = \sum_{i=1}^{3} N_{t-24i}$$

As illustrated in FIG. 3, the source-DR uses $T_{URI}$ to decide if delivery of some content should be switched to multicast. For example, some content URI that is currently served via unicast can be switched to multicast if the current number of sessions is above a certain threshold (e.g. 20), and the expected/predicted average duration is long enough (e.g. 10 minutes) and the probability for prematurely ended session is less than a certain probability (e.g. 0.5) etc. For this embodiment we assume the following simple switching logic using t as the current hour of the day and using current and predictive information (other more complicated decision logics can be implemented):

IF not multicast AND N>20 AND AD>10 AND P<0.5 AND S>100 AND PS(t+1)>N/2
THEN switch to multicast
ELSE continue unicast Each time the counter increases for a URI that is not yet on multicast the decision logic is invoked again for this URI.

Actions Taken in the Network Following Trigger Conditions being Met:

This section describes the actions taken in the network once the trigger conditions are met.

There are two sets of actions that can be done in order to successfully switch from unicast to multicast. Since, in the presently-preferred embodiment, we use the existing PIM-SM tree building method, Candidate RPs (C-RP) and Candidate Bootstrap Routers (C-BSRs) may already have been set up. Group addresses are yet to be assigned since this depends on the subscription demand at the time. Given this, the following background actions are maintained to minimise the time it takes for the transition. In another embodiment, these actions can also be partially or fully done once multicast is engaged, but our approach minimises the delay between the multicast conditions being met and it being fully operational in the network.

1. BSR election is done periodically irrespective of multicast being engaged in the network.
2. C-RPs advertise their candidacy to the elected BSR with group address set to '0' so that BSRs can generate Bootstrap messages when PIM routers join the network.
3. PIM-enabled routers send Hello messages to each other even if all traffic remains unicast. This results in them having the RP-set, which is used for group-to-RP mappings when multicast is triggered. Subsequently, only Join/Prune messages need to be propagated when hosts join respective groups.

Other actions, as follows, are triggered by our proposed multicast enabler once it decides to switch a piece of content (URI-based) from unicast to X hosts to multicast. We assume that all hosts have a host-DR elected connected to the local subnet where the host resides, as proposed in RFC 2362 and RFC 4601.

1. A group address system is generated. There are several methods of doing this. One approach is to assign one group address for every URI. This might result in a vast number of group addresses being available. In another approach, group addresses can be assigned per geo-location combination of host group and source(s) such that the hash function of the group address yields the RP that is closest to both the source and the group members, making the RPT structure more efficient. Multicast Address Dynamic Client Allocation Protocol (MADCAP) is proposed in RFC 2730 for hosts to request and be assigned a multicast group address.

There are already existing permanent multicast address assignments by IANA. If the user has availability of an assigned range, one implementation of this can use this existing set of group addresses across all the content that is transferred over the network. Alternatively, one can use a dynamic pool of addresses that can be reused as groups collapse from the administratively scoped range.

The address assignment server manages this aspect and returns the source-DR a group address for its unicast source address. Using the source unicast address, the RP-set (flooded using bootstrap messages to 'ALL-PIM-ROUTERS'), group address and a hash mask, the RP-to-group mapping is done using the existing hash function method described in RFC 4601.

2. The source-DR creates the required session description information (Session Description Protocol) for the same content, now to be switched to multicast mode. It also triggers the source to generate a multicast-specific URI for this content, depending on whether this is necessary for the client to re-subscribe to the multicast stream.

The source-DR, having decided to switch to multicast for a given media stream, then encapsulates the incoming packets from the source for this stream in a Register message to the respective RP. Note that if a single source holds several content pieces and the source-DR has decided to switch to multicast entirely, the respective source-DR registers each of the content pieces with the respective RPs, depending on the group address. Alternatively, if only some of the content streams are switched over to multicast, then the source-DR handles the Register messages for those streams only.

If no groups have been created by this point, the RP sends a Register-Stop to the source but creates a SPT route entry to the source with no outgoing interfaces.

3. There are two possible scenarios for a host to join to a multicast stream. It can have an existing unicast session with the media server using a media streaming protocol set such as RTSP/RTP, or it can be issued with multicast group information to connect to straight away when it first requests for the content from the source. The latter is applicable when a multicast session has already been set up and a host is happy to receive the data that is currently being transferred (e.g. live streaming/TV with no catch up service). We will consider each of these scenarios separately:

a. Fresh request from host
A host requests for a unicast stream, without knowledge of the existence of a multicast stream or its group address. Given that there are several media streaming and control protocols, including proprietary ones unique to specific media server implementations, we specify that one must implement a method of communicating from the server to the client that the service should be subscribed to via multicast. This can be done by embedding a new multicast URI in the HTML response to the client browser, or using a response message after the unicast request is received by the server/source-DR that provides the client with either the group address string or a URI to obtain this. For example, the server changes the HTML string that links to the content stream when the browser requests for this link, so that the host is directly mapped to the multicast stream without further exchange.

b. Transfer existing unicast stream to multicast tree
This requires live feedback from the source/source-DR to the host, requiring it to setup a new multicast session. The specific implementation of how this is achieved depends on the protocol stack implemented for the specific media stream. If a backchannel is available for the server to send commands to the client, this can be used to issue the new multicast group address string or the URI to obtain this. Alternatively, if RTSP is being used in unicast, the source announces this change to the host using Announce, Redirect or Set_Parameter messages. The host can also be set up to make periodic Get_Parameter requests to verify the current multicast/unicast status for its session. It is also possible for the host to request the content to start at a given time, so that the stream can be continued from the point at which the transition has been triggered. This feature cannot be used in a fixed stream download but we will return to this later. If HTTP is used, the host can be configured to periodically request for the current status of the streaming method, to which the media server/source-DR responds with the new URI or group address to which the host must then set up a membership.

The outcome of both steps is that the upper-layer-protocol triggers the extended IP module (RFC 1112) that supports multicast to issue a membership join request to its directly connected multicast router. Most hosts implement IGMP, which will be used henceforth in our embodiment but the messages themselves are protocol-dependent.

An IGMP Membership Report (IGMP Join) with the specified group address is sent to the host-DR. This results in a JoinDesired(*,G) or JoinDesired(S,G) state (implementation-dependent) change in the host-DR from its inactive state. A route entry is created for this change.

Following this, the host-DR uses the known hash function to trigger a (*, G) or (S, G) Join/Prune message towards the RP or the Source. The choice of whether or not to trigger an RPT or SPT depends on the implementation. We cover the set-up required for an RPT, from which the SPT is well-understood. All these actions and when each option is used are covered in RFC 2362 and RFC 4601. The innovative aspect of the present work is the network's autonomous capability of triggering of multicast functionality based on our predictive analytics method. The detailed embodiment is based on an example of PIM-SM.

The Join/Prune message travels hop-by-hop towards the RP or the Source, based on the unicast routing protocol (OSPF, IS-IS, RIP being examples of such). This aspect of tree-building is done using native multicast methods. Following this, the RP or the source starts to multicast the content, from the requested time range if applicable, to the host. At this point, the host receives two copies of the same content.

4. The final aspect to complete the switch to multicast is the host's capability to detect that multiple copies of the same content are being received. This can be done by the media player matching the two streams (received on different interfaces, as specified by the upper-layer-protocols) to each other and using pattern detection to identify that one stream is identical to the other. Evidently, errors in transmission should be taken into account in addition to potential delay variations between the streams due to the nature of network congestion and hop-by-hop delivery.

Also noteworthy is the scenario where the two streams received are not exactly matched in time. In this embodiment we assume that all hosts receive the same real-time stream and are essentially synchronised. However, because of network delays, packets can arrive at hosts at different times, resulting in small time differences between the unicast and multicast streams. The receiving host must be able to transition from one stream to the other, either using its buffering capability or upper-layer protocols that are available to the media player. The host's buffer can store the incoming packets on both streams, potentially also requesting missing chunks if supported/applicable, while playing only one synchronised stream to the user, until both streams overlap. Once this has been achieved, irrespective of whether the unicast stream is ahead of behind the stream received through the multicast tree, the host must end the unicast session with the source as dictated by this protocol. In RTSP, for example, this is done by sending the Teardown message to the server. If the transition cannot be achieved to multicast, the host can issue an IGMP Leave for that group which results in its group membership being terminated and multicast no longer being received on this interface. Alternatively a unicast failover mechanism can be used.

Note that while we use PIM-SM, IGMP and RTSP or HTTP as examples, our intention is to cover the functionality rather than pin down the specific messages sent back and forth between hosts, routers and media servers.

The result of the above process is that the host and source/source-DR have been enhanced with intelligence to decide to trigger multicast in a network autonomously depending on the usage of content and its forecasted demand. The inventive aspect of our system is the intelligent capability and mechanism to autonomously trigger a switch from multiple unicast streams to a single multicast stream using a novel entity called a 'multicast enabler' and its effect is to trigger the building of a multicast tree and source/host memberships to this tree. While we assume a single tree building mechanism here, other embodiments could use multiple multicast trees as well.

Consolidation of Identical Content Streams from Multiple Sources

This section describes how multiple identical streams that can be transmitted from more than one content server can be consolidated onto a single server using a technique applied by the source-DRs of the content servers.

We consider the additional complexity of having the same piece of content being available from more than one content server. Given what we have described so far, clients would be directed to each of these servers individually (potentially by a load balancer). This could result in a situation where two content servers can potentially be transmitting x and y number of sessions respectively, where both x and y values do not reach meet the conditions to trigger multicast, but the combination of (x+y) sessions on a single content server would, in fact, trigger multicast. We provide a solution to optimise this condition.

We propose that when a request is received from the client at the source-DR, it finds out which of the DRs that contain a copy of this content currently have an active session for this piece of content. This is done by using a protocol such as HTTP to declare to the other source-DRs that the given request has arrived at the source-DR that generates this advertisement. For example, for content X, which is available on two content servers A and B, a request that arrives at server A triggers a message to server B from A, announcing that this request for content X has arrived at server A. Server B, upon receiving this request, verifies its multicast table (Table 1 above) to determine if content X is currently being transmitted in a session to clients. At this point, it does not matter whether the content is being sent as unicast or multicast.

We can then have two scenarios: one where server B does not have an active session for this content (i.e. there is no other server with the specific piece of content); in which case, server A proceeds to deal with the request as described above as if it is the only provider of content X. It may serve this content to the requesting client (e.g. called C) as unicast, start a new multicast stream or subscribe the user to an existing multicast stream as described above, according to the prescribed conditions.

However, if server B does have an existing session in its table for content X, then it returns this information to server A. Server A now sends out a re-direct message to the client C with the address for server B. Once the client sends the request for content X to server A, this content server proceeds to deal with the request as if it is the only provider of content X.

Using this mechanism, we consolidate session requests such that a single piece of content will be served by one content server and multicast will be triggered from this content server when the relevant conditions are met. When the current session ends, the next request for content X will be sent to either of the two content servers (as determined by the load balancer, for example). This results in a system where for as long as a content server continues to transmit a piece of content, it will continue to receive all requests for this piece of content via re-directs from other source-DRs and will have to provide this content to the clients. When there are no more active sessions on a content server for a piece of content, the next request will be served by the next allocated content server, which will then be the primary consolidation point for future sessions until there are no more active sessions.

Worked Example

We provide here an example of switching over an existing RTSP session to a multicast session, assuming that a later request triggers multicast and the network must be engaged in multicast mode including setting up membership for an existing content consumer who is switched over to the multicast stream by the source and subsequently terminates the existing unicast stream.

We assume for this example that some background tasks are carried out despite multicast not being active in the network. It is not imperative to carry out these tasks all the time when multicast is not switched on but performing them is likely to decrease the time to full operation when the trigger conditions are eventually met. This is as described in the above section headed "consolidation of identical content streams from multiple sources". We consider a private network which uses locally scoped addresses for both unicast and multicast. A BSR is periodically elected, C-RPs advertise their candidacy to the BSR using C-RP-Adv messages with '0' as their group address. The BSR regularly floods Bootstrap messages to 'ALL-PIM-ROUTERS' to communicate the RP-set to the dormant PIM routers so that they can perform the group-to-RP mapping hash function when needed without having to wait for the RP-set to be sent to them once multicast must be engaged. Thirdly, DR election regularly takes place using Assert messages to ensure that each subnet or local group of hosts have a multicast-enabled router that can receive their membership reports when needed. Fourthly, PIM routers are kept alive using periodic Hello messages to each other. The methodology and options in performing these tasks can be found in PIM-SM RFC 4601 and RFC 2362.

Now consider a fixed stream requested by host H1 (IP address: 10.1.4.10) to a source S (IP address: 192.168.10.10), which has been resolved using a URI provided to H1 on a browser (rtsp://example.com/application/contentStream). We call this fixed stream C1. Assume that this URI maps to only one source address so as to avoid complexities introduced by load balancers. Also assume that the host supports RTSP. The media player triggers a request to this URI using an RTSP Setup message. The setup, play and control of this stream is prior art and can be understood from RFC 2326.

TABLE 2

| | | | MC/ | | | | | | |
|---|---|---|---|---|---|---|---|---|---|
| ID | URI | N | UC | C24 | CW | P | S | AD | $PS_{0,\ldots,23}$ |
| ... | | | | | | | | | |
| 15 | example.com/application/contentStream | 19 | UC | 121 | 121 | 0.01 | 567 | 97 | (00.00:77, 01.00:56, 02.00:3 08.00:0, ..., 12.00:0 ..., 18.00:233, 22.00:221, 23.00:198) |
| ... | | | | | | | | | |

Caption: Extract from $T_{URI}$ after the request from H1, time is t = 16.58

At a later time, Host H2 (IP address: 10.1.4.11) also requests the same URI. This triggers again the evaluation logic. According to Table 2 we now have the following parameters in $T_{URI}$: N=20, AD=97, P=0.01, S=567, $PS_{t+1}=P_{18}=233$.

Using Our Evaluation Logic

IF not multicast AND N>20 AND AD>10 AND P<0.5 AND S>100 AND PSt+1>N/2

THEN switch to multicast

ELSE continue unicast results in switching the stream to multicast and in updating the row in $T_{URI}$ as shown in Table 3.

TABLE 3

Extract from $T_{URI}$ after the request from H2 and the resulting switch to multicast, time is t = 17.01

| ID | URI | N | MC/UC | C24 | CW | P | S | AD | $PS_{0,\ldots,23}$ |
|---|---|---|---|---|---|---|---|---|---|
| ... | | | | | | | | | |
| 15 | example.com/application/contentStream | 20 | MC | 122 | 122 | 0.01 | 567 | 97 | (00.00:77, 01.00:56, 02.00:3 08.00:0, ..., 12.00:0 ..., 18.00:233, 22.00:221, 23.00:198) |
| ... | | | | | | | | | |

In addition to this, the source also builds a record such as one shown in Table 4 that holds information about the consumers of a given piece of content (URI).

TABLE 4

Sample URI-host mapping table

| URI | Current position into content (hours) | Content consumers ID |
|---|---|---|
| example.com/application/c1 | 1:15 | H1, H2, H5, H7, H10, H16 |
| example.com/application/c2 | 0:45 | H1, H3, H5, H6, H7, H8, H9, H10 |

The source can register the host's IP address against the URI being requested from the initial RTSP request. However, it is preferable for there to be a method of gaining knowledge about which hosts continue to be members of a given group (and therefore still receive a fixed stream). This information can be obtained through keep-alive messages sent as part of RTSP, which informs the source that data from a given session is still being consumed. This information is used to trigger migration from unicast to multicast for existing unicast receivers for this piece of content (below).

If possible, the same data could be collected for multicast members although note that this is then different to the traditional PIM-SM/IGMP approach of not having knowledge of all the hosts of a given group. If data about continued host membership to groups (and therefore content) can be periodically collected from host-DRs or IGMP snooping devices (if in place), it can be used to trigger unicast back on these hosts, should multicast no longer be desired at a later time. If there is a method in the network of aggregating the membership in a way that a more generic knowledge of which host-DRs subscribe to which groups is still derivable from the data stored, this can be used instead as well.

From the above evaluation, the source-DR now must trigger multicast in the network for content stream C1.

The first step for the source-DR is to trigger generation of group addresses for this URI. We assume that there is an address assignment server (deployed together with DHCP for unicast) that implements MADCAP and dynamically assigns the group for this URI an address of 239.192.10.1. This address is negotiated with the source-DR as described in RFC 2730.

Assume that there are N RP elements in this network system, the unicast addresses of which have been communicated to the source-DR by the BSR. The source-DR now performs a hash function to determine the RP to which the Register message must be sent. A Register message (encapsulating the data packet from the source for this URI, starting at the clock time when multicast was triggered) is unicast hop-by-hop to the RP. Assuming that this process occurs before members have enrolled to this group, the RP creates the multicast route entry for this source and sends a Register-stop back.

The source must also trigger a new SDP file to be generated for the multicast stream and create a new URI for accessing this stream, for future host requests for this URI. Assume that the new URI generated is rtsp://example.com/application/contentStream?mcplaycmd. The multicast SDP is created in the media server.

Using the table above that maps URIs to hosts, maintained by the source or its DR, we find that H1 currently consumes content C0. We use RTSP to send out an Announce, Set_Parameter or a periodic Get_Parameter-response combination to pass the new multicast URI to H1. Note that the mechanism of setting up the new URI is only a part of host-source management, rather than a function for the network itself. This work covers the actions triggered in the network in response to the trigger conditions rather than just switching to a new URI on the media server and assuming that the network is already multicast-capable.

The IP Module in H1 is assumed to be extended to include multicast compatibility and IGMP support. The new RTSP control message triggers the upper-layer-protocols to issue JoinHostGroup(239.192.10.1, interface) to IGMP, which then sends a MembershipReport to its host-DR (IP address: 10.1.4.1). Assume that this triggers an (*,G) state change in the host-DR but it could also trigger a (S,G) change if the specific source address is important and an SPT is to be built. This triggers a JoinDesired(*, 239.192.10.1) in the host-DR which then uses the hash function to map this to the relevant RP. A Join/Prune message is sent towards this RP and a (*,G) state is created in each of the hops in its path. This creates the relevant route entries in the Multicast Route Information Base (MRIB), Tree Information Base (TIB) and Multicast Forwarding Information Base (MFIB) based on the unicast protocol that PIM-SM exploits.

When the RP receives this PIM Join/Prune message from host-DR 10.1.4.1 for group 239.192.10.1, it sends a (192.168.10.10, 239.192.10.1) Join message to the source, creating a native SPT through which data flows to the RP. This is subsequently multicast to the host-DR, and finally transmitted to H1.

At this state, H1 receives two copies of the data—one through the unicast RTSP session and another through the multicast session. The host uses data packet matching to identify when this replication occurs. It also determines the time delay between the two streams and confirms whether it has the capability to adequately buffer the two streams until overlap occurs. If this is not possible due to excessive delay, this host H1 might not be able to avail of the multicast session and might have to leave this group. However, in our example, we assume that the host can buffer as required and starts to play the multicast stream seamlessly to the user.

Once this is successful, the unicast RTSP session must be terminated. This is done by sending a Teardown message to the source directly (covered in RFC 2326). Should the unicast session be required again at a later stage, a new session can be set up knowing the source unicast URI and its IP address.

A new host H3 (IP Address: 10.1.4.12) now sends a unicast RTSP message to the source, requesting for the content of the same URI. However, a multicast stream is currently in place for this content C0, which can either be presented to H3 in the original browser webpage requested (by altering the HTML to replace the unicast URI with the multicast URI) or as a response to the initial RTSP setup message with a Redirect message with the multicast URI. Host H3 will resolve this URI and send an IGMP Join to its host-DR in the same way as H1. The source-DR adds H3's IP address to its tables and updates its URI-membership list as well as adding this information to update its decision mechanism to trigger the switch to multicast.

References in the preceding discussion to a content delivery network should not be interpreted in a restrictive manner. A method according to the present invention may be implemented within any communications network which is capable of supported unicast and multicast. Furthermore, the use of a method according to the present invention is not limited to audio or video content data and may be used to transmit other types of data.

As the present invention may be implemented on software within a router, server, or other device, it may be possible to upgrade a conventional apparatus to one which can perform a method according to the present invention. Computer code may be deployed to an apparatus via download, for example via the internet, or on some physical media, for example, DVD, CD-ROM, USB memory stick, etc.

The present invention provides a method of distributing content from a source in a content delivery network, the method comprising: monitoring requests for delivery of an item of content; obtaining a prediction of future demand in respect of the said content; applying a unicast-to-multicast switching decision algorithm, the switching decision algorithm taking into account the prediction of future demand and arranged to determine whether at least one trigger condition is met; and, dependent on the outcome of the unicast-to-multicast switching decision algorithm, initiating the transition of a plurality of unicast data streams to a multicast data stream in respect of the item of content.

What is claimed is:

1. A method of distributing content from a source in a content delivery network, the method comprising the steps of:
   a) monitoring requests for delivery of an item of content;
   b) obtaining a prediction of future demand in respect of the content;
   c) applying a unicast-to-multicast switching decision algorithm, the switching decision algorithm taking into account the prediction of future demand and arranged to determine whether at least one trigger condition is met;
   d) dependent on the outcome of the unicast-to-multicast switching decision algorithm, initiating the transition of a plurality of unicast data streams to a multicast data stream in respect of the item of content, wherein the prediction of future demand in respect of the content made in step b) is based on data unrelated to actual demand for said content, wherein the data unrelated to actual demand for said content comprises trending data obtained from a search engine and/or social media data source;
   e) upon receiving a request from a client in respect of an item of content at a first source, the first source establishing if any other source has any active sessions in respect of the requested content; and
   f) if there are no active sessions in respect of the requested content, the first source will serve content to the client; or
   g) if there is an active session at a further source in respect of the requested content, forwarding the address for the further source to the client such that the client can request the content from the further source.

2. A method according to claim 1, wherein in step f) the first source serves the requested content to the client by either: initiating a unicast stream; initiating a new multicast stream; or subscribing the client to an existing multicast stream.

3. A method according to claim 1, wherein further to step g) if the further source receives a request for the content from the client, the further source serves the requested content to the client by either: initiating a unicast stream; initiating a new multicast stream; or subscribing the client to an existing multicast stream.

4. A method as claimed in claim 1, further comprising:
   maintaining a statistical record in respect of the requests directed at the source in respect of the item of content, and using at least some of the data in said record to obtain the prediction of future demand.

5. A method as claimed in claim 1, wherein transitioning the plurality of unicast data streams to the multicast data stream comprises:
   generating a group address system;
   creating session description information for the content to be switched to multicast; and
   joining a host to the multicast data stream.

6. A method as claimed in claim 5, wherein generating a group address system comprises assigning a group address per geo-location combination of host group and source(s) such that the hash function of the group address yields the rendezvous point that is closest to both the source and the group members.

7. A method as claimed in claim 5, wherein generating a group address system comprises using an existing set of group addresses, or wherein generating a group address system comprises using a dynamic pool of addresses.

8. A method as claimed in claim 5, wherein, in respect of the step of joining a host to the multicast data stream, the host has requested a unicast data stream and has not yet started to receive the stream.

9. A method as claimed in claim 5 wherein, in respect of the step of joining a host to the multicast data stream, the host has already started to receive a unicast stream.

10. A method as claimed in claim 5 further comprising causing the multicast content to start at a given time, in response to a request from the host to do so.

11. A method as claimed in claim 5 further comprising terminating the unicast session in response to the host detecting that substantially the same content is being received via unicast and via multicast.

12. A method according to claim 1, wherein in step f) the first source serves the requested content to the client by either: initiating a new multicast stream or subscribing the client to an existing multicast stream.

13. A network device including a computer processor for executing computer readable instructions such that the network device is configured to distribute content from a source in a content delivery network by performing steps comprising:
   a) monitoring requests for delivery of an item of content;
   b) obtaining a prediction of future demand in respect of the content;
   c) applying a unicast-to-multicast switching decision algorithm, the switching decision algorithm taking into account the prediction of future demand and arranged to determine whether at least one trigger condition is met;
   d) dependent on the outcome of the unicast-to-multicast switching decision algorithm, initiating the transition of a plurality of unicast data streams to a multicast data stream in respect of the item of content, wherein the prediction of future demand in respect of the content made in step b) is based on data unrelated to actual demand for said content, wherein the data unrelated to actual demand for said content comprises trending data obtained from a search engine and/or social media data source;
   e) upon receiving a request from a client in respect of an item of content at a first source, the first source establishing if any other source has any active sessions in respect of the requested content; and
   f) if there are no active sessions in respect of the requested content, the first source will serve content to the client; or
   g) if there is an active session at a further source in respect of the requested content, forwarding the address for the further source to the client such that the client can request the content from the further source.

14. The network device according to claim 13, wherein in step f) the first source serves the requested content to the client by either: initiating a new multicast stream or subscribing the client to an existing multicast stream.

15. A non-transitory computer readable storage medium storing instructions, which upon execution by a computer, implements the method of claim 1.

* * * * *